(12) United States Patent
Cartwright (10) Patent No.: US 10,638,760 B1
(45) Date of Patent: May 5, 2020

(54) METHOD TO INCREASE THE YIELD OF A MEDICINAL COMPONENT FOUND IN MAYAPPLE PLANTS

(71) Applicant: Timothy B. Cartwright, Collierville, TN (US)

(72) Inventor: Timothy B. Cartwright, Collierville, TN (US)

(73) Assignee: Floratine Products Group, Inc, Collierville, TN (US)

( * ) Notice: Subject to any disclaimer, the term of this patent is extended or adjusted under 35 U.S.C. 154(b) by 0 days.

(21) Appl. No.: 16/013,202

(22) Filed: Jun. 20, 2018

Related U.S. Application Data

(63) Continuation-in-part of application No. 15/010,105, filed on Jan. 29, 2016, now abandoned.

(51) Int. Cl.
*A01N 59/06* (2006.01)
(52) U.S. Cl.
CPC .................................... *A01N 59/06* (2013.01)
(58) Field of Classification Search
CPC .............. C05C 5/04; C05C 7/00; A01N 59/06
See application file for complete search history.

(56) References Cited

U.S. PATENT DOCUMENTS

2007/0251145 A1* 11/2007 Brusatore ............ A01G 31/047
47/83

OTHER PUBLICATIONS

Davis, J., Valuable Forest Botanicals and Updates on Related Regulations, Presentation [online]. Depart. Horticultural Science North Carolina State University, 2011 [retrieved on Oct. 12, 2016]. Retrieved from the Internet:, 11 pages (Year: 2011).*
Mayapple—*Podophyllum peltatum*. [online]. Hawthorn Hill Wildflowers, 2010 [retrieved on Oct. 12, 2016]. Retrieved from the Internet:, 4 pages. (Year: 2010).*
Zheljazkov, V., Lignan and Nutrient Concentrations in American Mayapple (*Podophyllum peltatum* L.) in the Eastern United Stated, 2009, HortScience, vol. 44, Issue 2, pp. 349-353. (Year: 2009).*
Gardner, Z., Cultivation and Marketing of Woodland Medicinal Plants, 2002, The Natural Farmer, Special Supplement on AgroForestry, 7 pages. (Year: 2002).*

* cited by examiner

*Primary Examiner* — John Pak
*Assistant Examiner* — Andriae M Holt
(74) *Attorney, Agent, or Firm* — Veritay Group IP PLLC; Susan B. Fentress (57) ABSTRACT

The present invention relates to foliar treatment of Mayapple plants to increase the height of the plant, increase leaf areas, delayed senescence, induced fruit development on a single stem plant and increased podophyllotoxin yield.

11 Claims, 5 Drawing Sheets

METHOD TO INCREASE THE YIELD OF A MEDICINAL COMPONENT FOUND IN MAYAPPLE PLANTS

CROSS-REFERENCE TO RELATED APPLICATIONS

This is a continuation-in-part of U.S. Ser. No. 15/010,105 files Jan. 29, 2016 hereby specifically incorporated by reference in its entity.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

This disclosure relates to methods to increase the yield of medicinal components found in Mayapple plants.

Description of Related Art Including Information Disclosed Under 37 CFR 1.97 and 1.98

Mayapple (*Podophyllum peltatum* L.) is a *Podophyllum*, which is an herbaceous perennial plant in the family Berberidaceae, described as a genus by Linnaeus in 1753. Mayapples are woodland plants, typically growing in colonies derived from a single root. The stems grow to 30-40 cm tall, with palmately lobed umbrella-like leaves up to 20-40 cm diameter with 3-9 shallowly to deeply cut lobes. The plants produce several stems from a creeping underground rhizome; some stems bear a single leaf and do not produce any flower or fruit, while flowering stems produce a pair or more leaves with 1-8 flowers in the axil between the apical leaves. The flowers are white, yellow or red, 2-6 cm diameter with 6-9 petals, and mature into a green, yellow or red fleshy fruit 2-5 cm long. All the parts of the plant, excepting the fruit, are poisonous. Even the fruit, though not dangerously poisonous, can cause unpleasant indigestion. The substance they contain (podophyllotoxin or podophyllin) is used as a purgative and as a cytostatic. Posalfilin is a drug containing podophyllin and salicylic acid that is used to treat the plantar wart. Mayapple also includes components that are effective in stopping cell division in certain tumors.

Podofilox (derived from the Mayapple) is the active ingredient in the first prescription drug approved by the FDA that allows patients to treat themselves for venereal warts. The extract of the plant has also been effective in treating measles and herpes simplex type I virus by inhibiting replication. Bedows, E. & G. M. Hatfield. 1982. An Investigation of the Antiviral Activity of *Podophyllum peltatum*. J Nayt Prod 45:725-729. Nine out of ten patients with oral hairy leukoplakia, which is a lesion and can be an early manifestation of the human immunodeficiency virus, have gone into remission after only two weeks of treatment with *podophyllum* resin. Lozada-Nur, F. & C. Costa. 1992. Retrospective Findings of the Clinical Benefits of *Podophyllum* Resin 25% Sol on Hairy Leukoplakia. Oral Surg Oral Med Oral Pathol 73:555-562.

Chemical analysis of the Mayapple reveals the presence of several lignins, which have been shown to have anti-cancer effects. The starting material of etoposide (Vepeside), an FDA approved cancer drug, is *podophyllum* and has been used to treat testicular cancer, as well as small-cell lung cancer, by inhibiting replication of cancer cells. Henderson, C. W. American Mayapple Yields Anti-Cancer Extract. Cancer Weekly 8:24-25. Becker, H. 2000. Mayapple's Cancer-Fighting Precursor. Agricultural Researcher 48:9.

Podophyllotoxin is used as the precursor in the manufacture of the semi-synthetic derivatives etoposide, teniposide, and etopophos. The United States Food and Drug Administration approved these drugs for the treatment of testicular and small cell lung cancer. Since 1995, when the patent covering these uses expired, the National Cancer Institute has listed 190 clinical trials for etoposide in new cancer therapies or as positive control. Ajani, J. A., Mansfield, P. F., Dumas, P. (1999). Oral Etoposide for Patients with Metastatic Gastric Adenocarcinoma. Cancer J. Sci. Am., 5(2): 112-114. Another compound, known as CPH 82, is a semi-synthetic derivative of podophyllotoxin and is in its third phase of clinical trials for the treatment of rheumatoid arthritis. Lerndal T, Svensson B (2000). A Clinical Study of CPH 82 vs. Methotrexate in Early Rheumatoid Arthritis. Rheumatology (Oxford), 39(3).

To meet pharmaceutical industry demand, *P. emodi* is still harvested from the wild. *P. emodi*, Himalayan Mayapple or Indian Mayapple, is native to the lower elevations in and surrounding the Himalaya. However, it is difficult to collect from the wild and to properly supervise the harvest of a high-quality product. Furthermore, excessive harvest has resulted in a significant decline of wild populations. Such decline has been reported in India with *P. emodi* now considered an endangered species. Foster, S. (1989). Phytogeographic and Botanical Considerations of Medicinal Plants in Eastern Asia and Eastern North America. Herbs, Spices Med. Plants, 4: 115-144

The leaves of *P. peltatum*, American Mayapple, contain relatively high levels of podophyllotoxin. Canel, C., Dayan, F. E., Ganzera, M., Rimando, A., Burandt, C., Khan, I., Moraes, R. M., (2001). Increased Yield of Podophyllotoxin from Leaves of *Podophyllum peltatum* L. by in situ conversion of podophylotoxin 4-O-D glucopyranoside. Planta Medica., 67: 1-3. The podophyllotoxin content of *P. peltatum* leaves are lower than that of *P. emodi* rhizomes, but still enough to consider *P. peltatum* leaves a potential commercial source of the compound. NCNPR and USDA increased the potential of using leaves as a commercial source by patenting an easy and efficient water-based method to extract lignans from Mayapple tissue. Moraes, R. M., Andrade, Z. D., Bedir, E., Dayanc, H., Lata, I., Khan, F. E., Pereira, A. M. S., (2004). Arbuscular Mycorrhiza Improves Acclimatization and Increases Lignin Content of Micropropagated Mayapple (*Podophyllum peltatum* L.) Plant Sci., 166: 23-29.

Muhammad, in an article on Mayapple: A Review of the Literature from a Horticultural Perspective, Journal of Medicinal Plants Research Vol. 5(7), pp. 1037-1045, 4 Apr. 2011, asserted that: "These results indicate that podophyllotoxin content is a stable genetic trait rather than an effect of location or environment. These results also indicate that Mayapple leaves harvested from the wild may or may not produce acceptable yields of podophyllotoxin. The implications of this research indicate that genetic improvement of Mayapple may be possible by identifying, propagating, and genetically manipulating high-yielding genotypes. However, there is resistance in the public to genetically modified plants. A need exists to develop a method to increase the medicinal components found in Mayapple plants without the need for genetic modification of the plant.

BRIEF SUMMARY OF THE INVENTION

This invention provides a method for increasing the podophyllotoxin yield of a Mayapple plant. The method involves the steps of: applying to a foliar portion of the mayapple plant a solution containing a calcium cation to initially increase podophyllotoxin yield of the mayapple plant by at least 6-fold. The method can further include reapplying to the foliar portion of the mayapple plant a solution containing a calcium cation to increase podophyllotoxin yield of the mayapple plant by at least 26.80-fold.

In addition to the foliar treatment, a section of soil surrounding the Mayapple plant, can be treated with a sufficient amount of soluble calcium to increase the total soluble base cations to greater than 45 percent of the total soluble base cations of the soil. Additionally, the sufficient amount of calcium is applied to obtain a total calcium content of the soil exceeding 800 ppm. Additionally, an increase in the podophyllotoxin yield can be obtained by adjusting a cation selected from the group consisting of: Ca, Mg, K and Na, to obtain a Cation Exchange Capacity (CEC) of the soil of greater than 7.0. Other soil parameters that can be adjusted include: pH of the soil is adjusted to greater than 6.0; an organic matter content of the soil is adjusted to greater than 3.0 percent; and a Saturation Index (SI) of the soil adjusted to greater than 1.2.

This invention also provides a method for plant enhancement of a Mayapple plant. The method includes the steps of: applying to a foliar portion of the Mayapple plant, after a leaf has completely unfurled, a solution containing 0.125 w/w percent of a calcium cation, wherein the plant enhancement includes the steps of: increasing leaf cluster diameter by at least 19.8 percent and increasing stem height by at least 25.9 percent of the Mayapple plant.

This invention also provides a method for plant enhancement of a Mayapple plant. The method includes the steps of: planting a plurality of Mayapple root segments; applying to a foliar portion of the Mayapple plant, after a leaf has completely unfurled, a solution containing 0.125 w/w percent of a calcium cation, wherein the plant enhancement is delaying senescence of the Mayapple plant.

BRIEF DESCRIPTION OF SEVERAL VIEWS OF THE DRAWING(S)

The invention can be best understood by those having ordinary skill in the art by reference to the following detailed description when considered in conjunction with the accompanying drawings in which.

DETAILED DESCRIPTION OF THE INVENTION

The present invention may be understood more readily by reference to the following detailed description of the invention. It is to be understood that this invention is not limited to the specific devices, methods, conditions or parameters described herein, and that the terminology used herein is for describing embodiments by way of example only and is not intended to be limiting of the claimed invention. Also, as used in the specification including the appended claims, the singular forms "a," "an," and "the" include the plural, and reference to a numerical value includes at least that value, unless the context clearly dictates otherwise. Ranges may be expressed herein as from "about" or "approximately" one value, and/or to "about" or "approximately" another value. When such a range is expressed, another embodiment includes from the one value, and/or to the other value. Similarly, when values are expressed as approximations, by use of the antecedent "about", it will be understood that the value forms another embodiment.

These and other aspects, features and advantages of the invention will be understood with reference to the detailed description herein, and will be realized by means of the various elements and combinations particularly pointed out in the appended claims. It is to be understood that both the foregoing general description and the following detailed description of the invention are exemplary and explanatory of preferred embodiments of the inventions and are not restrictive of the invention as claimed. Unless defined otherwise, all technical and scientific terms used herein have the same meaning as commonly understood by one of ordinary skill in the art to which this invention belongs. Reference will now be made in detail to the presently preferred embodiments of the invention, examples of which are illustrated in the accompanying drawings. Throughout the following detailed description, the same reference numerals refer to the same elements in all figures.

The present invention relates to foliar treatment of Mayapple plants to increase the height of the plant, increase leaf areas, delayed senescence, induced fruit development on a single stem plant and increased podophyllotoxin yield. Foliar application is the application of a plant nutrient in a liquid solution, with the plant nutrient dissolved in the solution, such as in the form of a salt. The solution is applied to the portions of the plant above the ground. Typically, between 0.5-2 percent of the solution is the plant nutrient in a foliar application.

The present invention relates to the foliar treatment of Mayapple plants (*P. peltatum*) to increase the height of the plant, increase leaf areas, delay senescence, induced fruit development on a single stem plants and to increase the medicinal component podophyllotoxin. Although an element such as calcium may be present in the soil, it is typically in the bound form, such as with phosphorus and bicarbonate, and is not available for nutrition. Plants can absorb essential elements through their leaves. The absorption takes place through their stomata, and through their outer epithelial cells. The present invention relates to foliar treatment of Mayapple plants to increase the height of the plant, increase leaf areas, delay senescence, and induced fruit development on a single stem plant. The plant is harvested two weeks after foliar treatment to maximize the Podophyllotoxin yield. The treatment began after the emergence of the Mayapple colonies and consists of foliar applications including calcium. The initial treatment of a dilute mixture containing 0.0125% water soluble calcium is preferably in the form of calcium nitrate. Alternately, a dilute solution of calcium chloride, calcium thiosulfate or calcium acetate can be applied. The percentage of calcium salt at 0.0125% is substantially below the amount typically applied in a foliar application.

EXAMPLES

In this experiment, the focus was on the production of podophyllotoxin. Various soil treatments were attempted to increase the yield podophyllotoxin. The Collierville colony of American Mayapple (*Podophyllum* peltatun (Mayapple) was treated with granular calcium carbonate in the months prior to emergence in March. Alternately, calcium sulfate or a similar calcium salt can be applied.

Table 1 shows the nutrient levels in the soil prior to foliar application of calcium.

| Variable | Neither | Control | Treated |
| --- | --- | --- | --- |
| Organic Matter, % | 2.1 | 1.9 | 3.2 |
| Saturation Index | 1.5 | 1.3 | 1.6 |
| Soluble Ca, meq/liter | 1.7 | 2.3 | 2.0 |
| Soluble Mg, meq/liter | 1.9 | 2.4 | 1.9 |
| Soluble K, meq/liter | 0.5 | 0.7 | 0.5 |
| Total N, meq/liter | 2.5 | 1.7 | 3.4 |
| Soluble P, meq/liter | 0.4 | 0.5 | 0.4 |

Figure 1:
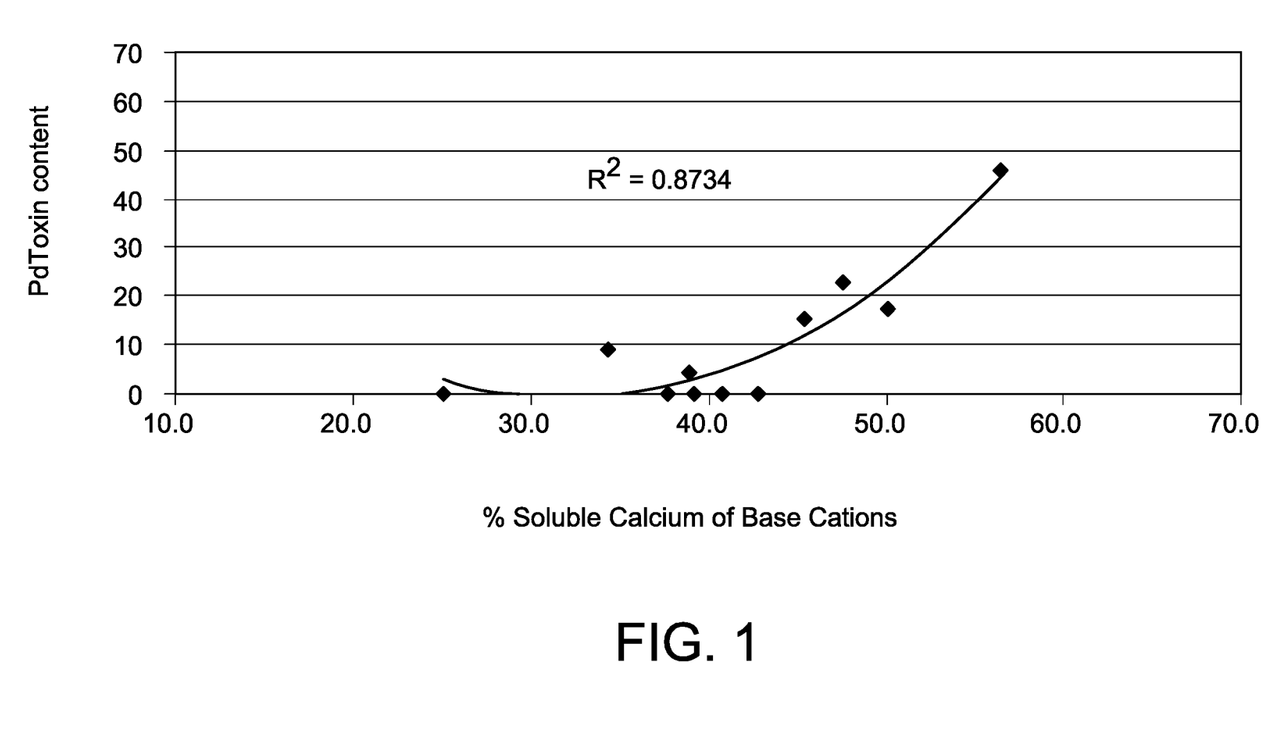
FIG. 1 shows the percent of soluble calcium of base cations vs the podophyllotoxin yield of the plant.

Now referring to FIG. 1, a graph shows the percent of soluble calcium of base cations vs. the podophyllotoxin yield of the Mayapple plant. FIG. 1 shows that podophyllotoxin yield is increased by increasing the soluble calcium content of the soil. This is accomplished by adding a sufficient amount of soluble calcium to the Mayapple plants to increase the total soluble base cations to greater than 45 percent of the total soluble base cations.

In FIG. 1, the percent soluble calcium content exchangeable calcium in the soil vs. the podophyllotoxin content is shown. The percent soluble calcium content is calculated as follows:

| Cations in Soil Solution | Meq/L from Harris Labs | % of Total Cations in solution |
| --- | --- | --- |
| Ca | 3.7 | (3.7/8) * 100 = 46.2 |
| Mg | 1.9 | (1.9/8) * 100 = 23.8 |
| K | 1.2 | (1.2/8) * 100 = 15.0 |
| Na | 0.8 | (0.8/8) * 100 = 10.0 |
| NH4 | 0.4 | (0.4/8) * 100 = 5.0 |
| Total | 8.0 | 100.0 |

Figure 2:
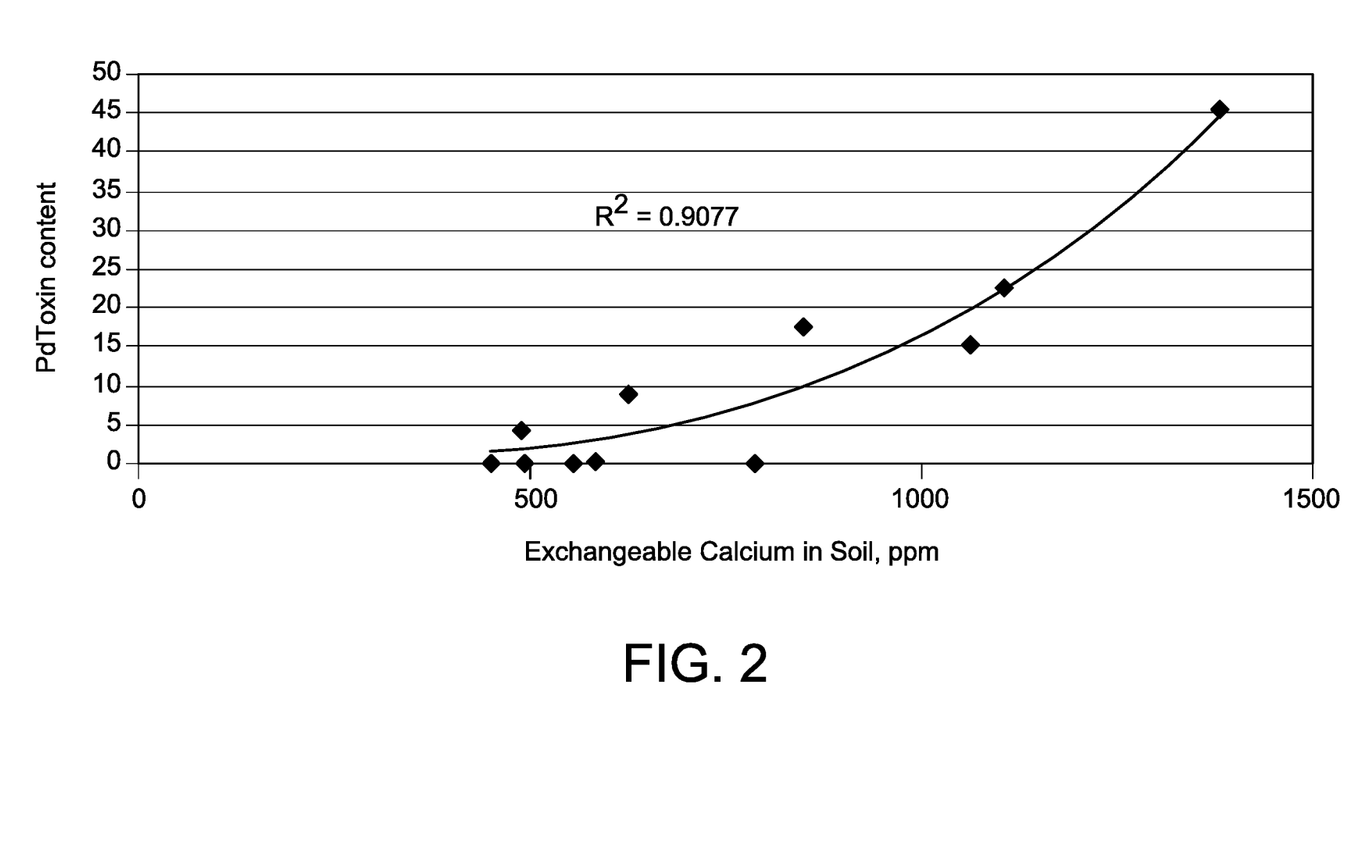
FIG. 2 shows exchangeable calcium in soil vs. the podophyllotoxin yield of the plant.

A graph of total exchangeable calcium in the soil vs. the podophyllotoxin content is shown in FIG. 2. Analysis of the data shows that high podophyllotoxin yield is obtained when the soil adjacent to the plants are treated to obtain a total calcium content exceeding 800 ppm. High podophyllotoxin yield is obtained when a sufficient amount of total calcium is applied to the Mayapple plants to obtain a total calcium content exceeding 800 ppm.

To ensure the soil calcium content exceeds 800 ppm, the proper sampling, testing and calculations are made. For example:
1. The standard agricultural weight of soil is 2 million pounds in an area of 1 acre-6 inches deep.
2. Test results show the calcium content is 674 ppm or 1,348 pounds per acre.
3. The area of the colony to be treated is 900 square feet (0.02 acres).
4. The calcium content of the soil within the colony is 1,348×0.02=27.0 lbs.
5. The desired calcium content of 800 ppm would 1,600 pounds per acre.
6. Desire calcium soil content within the colony would be 1,600×0.02=32 lbs.
7. Therefore, five pounds of calcium (as elemental calcium) must be spread evenly across the 900 sq. feet plot. If calcium carbonate, agricultural lime (32% Ca content), is the choice of soil amendment then the total amount of lime would be 5/0.32=15.6 pounds.
8. Total calcium content is calculated using the ammonium acetate soil test procedure known to one skilled in the art.

Cation exchange capacity (CEC) is a calculated number based on the calculation of Ca, Mg, K and Na. A cation exchange capacity (CEC) test is a soil test procedure known to one skilled in the art. High podophyllotoxin yield is obtained when the Cation Exchange Capacity (CEC) of the soil is adjusted to greater than 7.0. An example calculation of producing a CEC greater than 7.0 is shown below.
1. The beginning CEC of our 900 square foot plot is 5.6 and our goal is to raise it to 7.0.
2. The pH of the soil is 7.2 so there is no "$H^+$" contribution to the CEC.
3. The CEC of the beginning soil is calculated by:
    a. Ca 640/200=3.2 meq
    b. Mg 220/120=1.8 meq
    c. K 189/390=0.5 meq
    d. Na 25/230=0.1 meq
    e. Total 5.6
4. To raise the CEC we will apply 280 ppm of calcium:
    a. Ca (640+280)/200=4.6 meq
    b. Mg 220/120=1.8 meq
    c. K 189/390=0.5 meq
    d. Na 25/23=0.1 meq
    e. Total 7.0

Other related soil conditions include: Organic matter was greater than 3.0%; pH was greater than 6.0 and a Saturation Index was greater than 1.2.

Soil organic matter (SOM) is the organic matter component of soil, made of plant and animal residues at various stages of decomposition, cells and tissues of soil organisms, and substances synthesized by soil organisms. Soil organic matter is determined by burning off carbon in a furnace. The highest podophyllotoxin content samples had organic matter content greater than 3.0 percent. Organic matter levels this high characteristically supports essential microbial functions that lead to sufficient soil $CO_2$ production, calcium and magnesium solubility and nitrogen availability. Soil organic matter cannot be increased as easily. If possible, find a site that has organic matter levels above 3.0. If this is not possible, then the organic matter can be amended with soil-applied granular humic acid products or sprayed with water soluble humic acid solutions. This would most easily be accomplished by applying these humic products in the winter months prior to emergence. As with organic matter, pH appeared to have an effect on podophyllotoxin content. Four out of the five highest podophyllotoxin samples were grown in soil having a pH reading greater than 6.0 pH influences the solubility of micronutrients which influences plant growth.

Saturation Index (SI) is the soil's water holding ability compared with field capacity. As SI increases, the water content increases. It has been observed that soils with SI's higher than this are typically subject to compaction and low $CO_2/O_2$ percolation. Higher podophyllotoxin yield can be obtained by adjusting the Saturation Index (SI) to greater than 1.2. Saturation Index is influenced by organic matter and CEC. The method of adjusting Saturation Index would follow the actions taken to affect organic matter and CEC. In other words, the examples given previously for increasing organic matter and CEC would also result in higher Saturation Indexes. The soil test results are shown in Table 2.

TABLE 2

| Sample | % OM | pH | CEC | Sat. Index | Exchng Ca ppm | CaRatio | Pdtoxin ppm | | |
|---|---|---|---|---|---|---|---|---|---|
| CLANC | 2.5 | 6.2 | 6.7 | 1.23 | 916 | 46.7 | 53.1 | H | OM > 3 |
| STOMO | 3.1 | 6.3 | 9.2 | 1.2 | 1381 | 56.5 | 45.8 | I | pH > 6.0 |
| OXMS2 | 4.1 | 6.1 | 8.7 | 1.2 | 1106 | 47.6 | 22.76 | G | CEC > 7 |
| OXMS1 | 3.4 | 5.7 | 8.5 | 1.28 | 849 | 50.0 | 17.6 | H | Sa. Index > 1.2 |
| UMMS2 | 3.6 | 6.3 | 7.8 | 1.3 | 1064 | 45.5 | 15.4 | | Soluble Ca > 45% |
| BAMS1 | 2 | 5.9 | 5.8 | 1.07 | 624 | 34.4 | 8.8 | | |
| LAMS1 | 1.7 | 5.5 | 6.1 | 1 | 488 | 38.9 | 4.2 | | |
| OXMS3 | 2.4 | 6.2 | 6.3 | 1.09 | 785 | 51.9 | 0.48 | | OM < 3.0 |
| UMMS1 | 2.8 | 5.7 | 6.3 | 1 | 556 | 39.1 | 0.266 | L | pH < 6.0 |
| LAMS2 | 2.1 | 5.1 | 9 | 1.07 | 583 | 45.5 | 0.09 | O | CEC < 7 |
| LAMS3 | 2.2 | 5.4 | 6.9 | 1.13 | 491 | 25.0 | 0.02 | W | Sat Indx < 1.1 |
| LAMS4 | 2.4 | 5.5 | 5.7 | 1.05 | 449 | 42.9 | 0 | | Soluble Ca < 45% |

The subsequent year trials included the soil application of calcium carbonate to the colony of Mayapple in Collierville. Further, each of 14 sites in Northern Mississippi were sampled and tested for nutrition content as well as the podophyllotoxin and peltatin content. The soil test results are shown in Table 2. Leaf samples were gathered from the Collierville colony and sent to the University of Mississippi pharmaceutical laboratory for testing in accordance with Henderson and Becker. However, soil treatment of Mayapple plants only provides some increase in podophyllotoxin yield. Foliar Treatment has been found to significantly increase podophyllotoxin yield.

Example: Foliar Treatment

The Collierville colony of American Mayapple (*Podophyllum* peltatun (Mayapple) was treated with granular calcium carbonate in the months prior to emergence in March. After the leaves had completely unfurled, a weekly misting of a solution containing 0.125 w/w % calcium cation soluble calcium, was applied to the canopy of the "Treated" colony.

Example, Foliar Treatment

Figure 3:
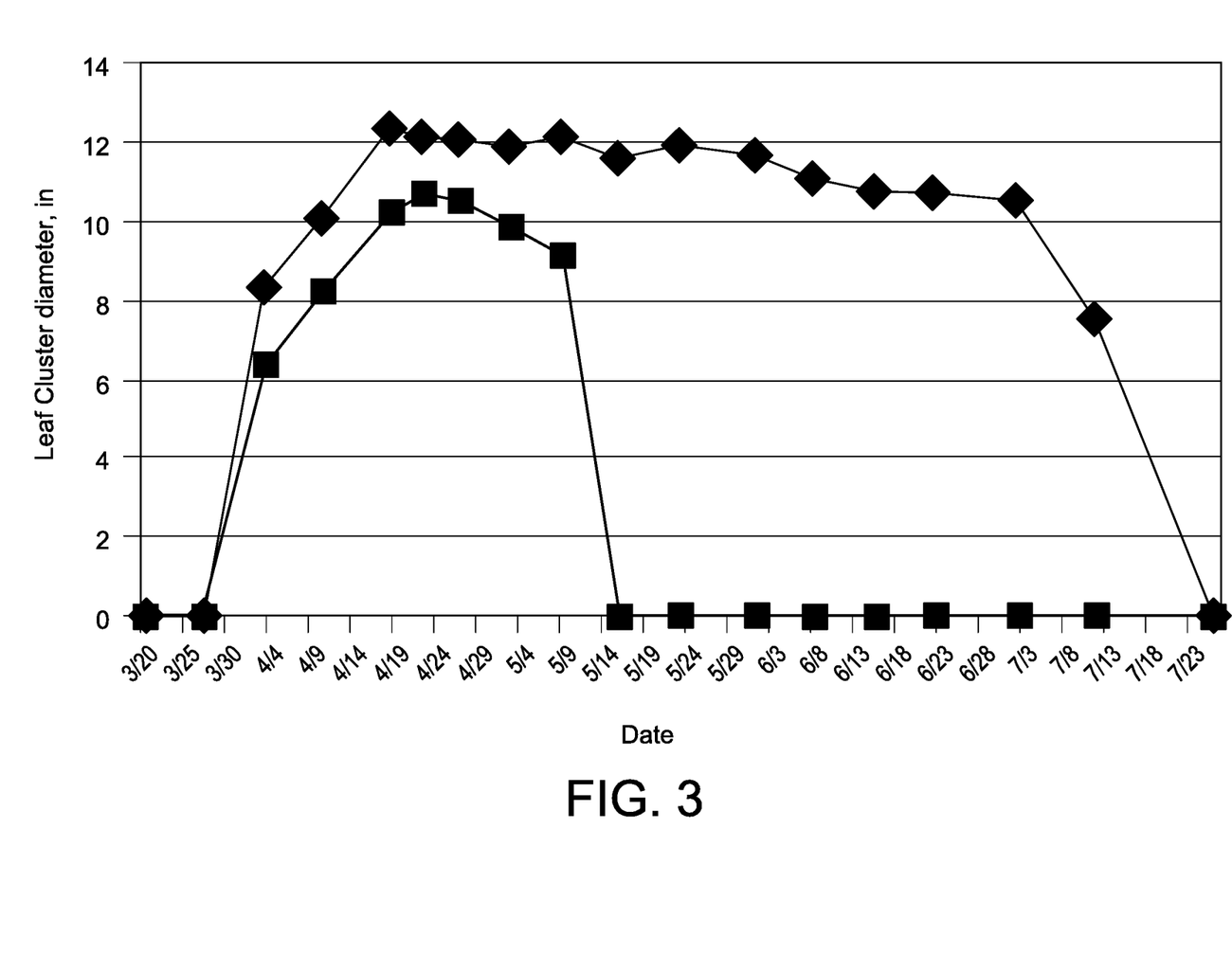
FIG. 3 shows leaf cluster diameter. The box is the control and the diamond are the treated plants.
Figure 4:
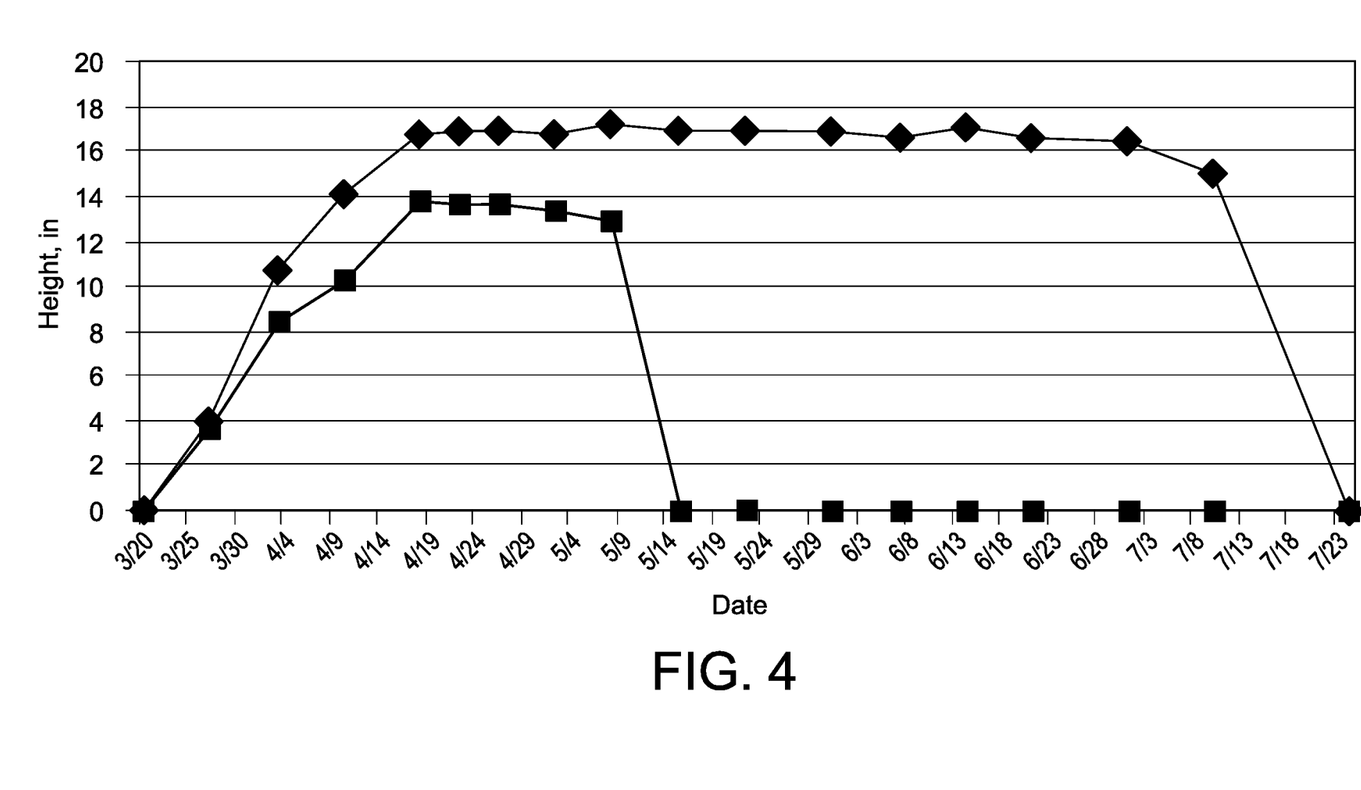
FIG. 4 shows height of plant chart. The box is the control and the diamond are the treated plants.

The Collierville colony of American Mayapple (*Podophyllum* peltatun (Mayapple) was treated with granular calcium carbonate in the months prior to emergence in March. After the leaves had completely unfurled, a weekly misting of a solution containing 0.125 w/w % calcium cation soluble calcium, was applied to the canopy of the "Treated" colony. Day 1 represents the first day of foliar application. Foliar application refers to the application of plant nutrients to above the ground plant parts. Foliar applications then followed on the $14^{th}$ and $28^{th}$ day. The leaves are typically harvested 3-4 weeks after the first treatment, but preferably before the Podophyllotoxin content decrease. Leaf samples were also taken from both the Treat and Control colonies and submitted to the University of Mississippi for determination of podophyllotoxin content. FIGS. 3-4 show data on plant health.

TABLE 3

| Harvest Date | Colony | α-Peltatin (ppm) | Podophyllotoxin (ppm) | β-Peltatin |
|---|---|---|---|---|
| Day 1 | Control | 11,740 | 11 | 2,290 |
| Day 1 | Treated | 9,600 | 84 | 1,400 |
| Day 14 | Control | 11,080 | 0 | 1,038 |

TABLE 3-continued

| Harvest Date | Colony | α-Peltatin (ppm) | Podophyllotoxin (ppm) | β-Peltatin |
|---|---|---|---|---|
| Day 14 | Treated | 14,039 | 295 | 1,430 |
| Day 28 | Control | 10,891 | 0 | 591 |
| Day 28 | Treated | 11,369 | 92 | 521 |

The results of the, foliar treatment include: 1) 25.9% increased stem height; 2) 19.8% increase is leaf cluster diameter; 3) 33.3% increase in canopy area; 4) a doubling of "double-stemmed" plants; 5) extended leaf senescence by two months and 6) an initial increase in Podophyllotoxin (ppm) yield of about 600 percent as compared to the control and a yield of podophyllotoxin increased from a maximum of 11 ppm in the control to a maximum of 295 ppm in the Treated. This represents a 26.80 fold increase in the podophyllotoxin concentration over the control.

TABLE 4

| C'ville colony | Control | Treated |
|---|---|---|
| Single Stem Plants | 28 | 19 |
| Double Stem Plants | 13 | 28 |
| Ave. Height | 13.5 | 17.0 |

TABLE 4-continued

| C'ville colony | Control | Treated |
|---|---|---|
| Ave Diameter | 10.1 | 12.1 |
| Canopy Area, ft2 | 0.589 | 0.785 |

Note:
The treated group had 19 blooms total.
There were six single stem blooms.
The control Group had no blooms.

Example: Growing Mayapple as a Row Crop

Figure 5:
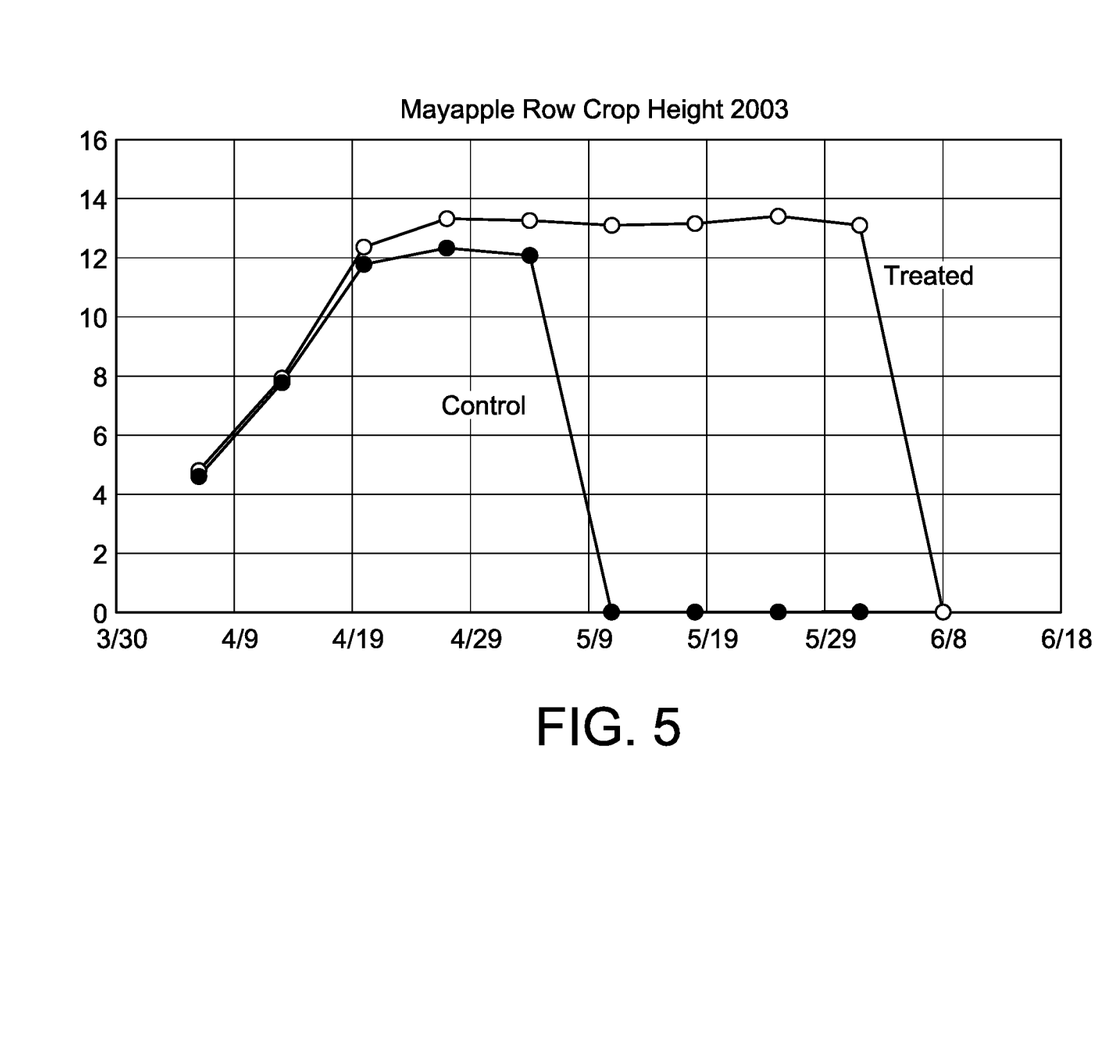
FIG. 5 shows length of viability of treated plants versus a control.

About 1000 root segments of the Mayapple plants (*P. peltatum*) were purchased and planted in November. The plowed plot was about 50 wide by 100 feet long. The row spacing was 3 feet and the plant spacing about 6 inches. Treated (foliar) and Control (no treatment) Mayapple plants were planted in alternate rows. Foliar treatment began with the emergence of the leaves on April 3. Measurements began when the leaves had fully unfurled the next week. There were 8 rows of control (untreated) and 8 rows of treated (foliar spray). The first spray took place on the odd number rows on April 15 and the health of the plants began to show separation from the control group. The treated group stayed viable for about 1 month longer than the control a shown in FIG. 5.

Equivalent elements can be substituted for the ones set forth above, such that they perform in substantially the same manner and way for achieving substantially the same result. It is believed that the system and method of the present invention, and many of its attendant advantages, will be understood by the foregoing description. It is also believed that it will be apparent that various changes may be made in the form, construction and arrangement of the components, thereof without departing from the scope and spirit of the invention, or without sacrificing its material advantages. The form herein before described being merely exemplary and explanatory embodiment thereof. It is the intention of the following claims to encompass and include such changes.

The invention claimed is:

1. A method to increase podophyllotoxin yield of a Mayapple plant (*P. peltatum*) comprising the steps of
treating a section of soil adjacent the Mayapple plant, before the Mayapple plant emerges with a granular calcium carbonate, wherein the amount of granular calcium carbonate is 5000 pounds per acre;
after emergence applying to a foliar portion of the Mayapple plant, a solution containing a calcium cation, to increase the podophyllotoxin yield of the Mayapple plant by at least 6-fold, wherein the calcium cation is calcium nitrate applied at 0.125 w/w percent of the solution.

2. The method of claim 1, comprising reapplying to the foliar portion of the Mayapple plant a solution containing calcium nitrate to increase podophyllotoxin yield of the Mayapple plant by at least 26.8-fold.

3. The method of claim 1 further comprising the step of: adjusting the pH of the soil to greater than 6.0.

4. The method of claim 1, further comprising the step of: adjusting the organic matter content of the soil to greater than 3.0 percent.

5. The method of claim 1, further comprising the step of: adjusting the Cation Exchange Capacity (CEC) of the soil to greater than 7.0.

6. The method of claim 1, wherein a Saturation Index (SI) of the soil is adjusted to greater than 1.2.

7. The method of claim 1 wherein the Mayapple plant is harvested before the podophyllotoxin yield decreases.

8. A method for plant enhancement of a Mayapple plant, comprising the steps of:
applying to a foliar portion of the Mayapple plant, after a leaf has unfurled, a solution containing 0.125 w/w percent of calcium nitrate, and
treating a section of the soil surrounding the Mayapple plant with an amount of granular calcium carbonate, wherein the amount of granular calcium carbonate is 5000 pounds per acre;
wherein the plant enhancement comprises increasing leaf cluster diameter by at least 19.8 percent and increasing stem height by at least 25.9 percent of the Mayapple plant.

9. A method for plant enhancement of a Mayapple plant, comprising the steps of:
planting a plurality of Mayapple root segments;
treating a section of soil adjacent the Mayapple plant, before the Mayapple plant emerges with a granular calcium carbonate, wherein the amount of granular calcium carbonate is 5000 pounds per acre; and
applying to a foliar portion of the Mayapple plant, after a leaf has unfurled, a solution containing 0.125 w/w percent of calcium nitrate, wherein the plant enhancement comprises delaying senescence of the Mayapple plant.

10. The method of claim 9 further comprising: the step of planting the plurality of Mayapple root segments in crop rows in a field.

11. The method of claim 10, wherein the field is located to provide at least six hours of direct sunshine per day, when the sun is visible in the field.

* * * * *